July 10, 1928.
H. M. STIEGLITZ
1,676,298
OUTLET BOX
Filed March 21, 1925
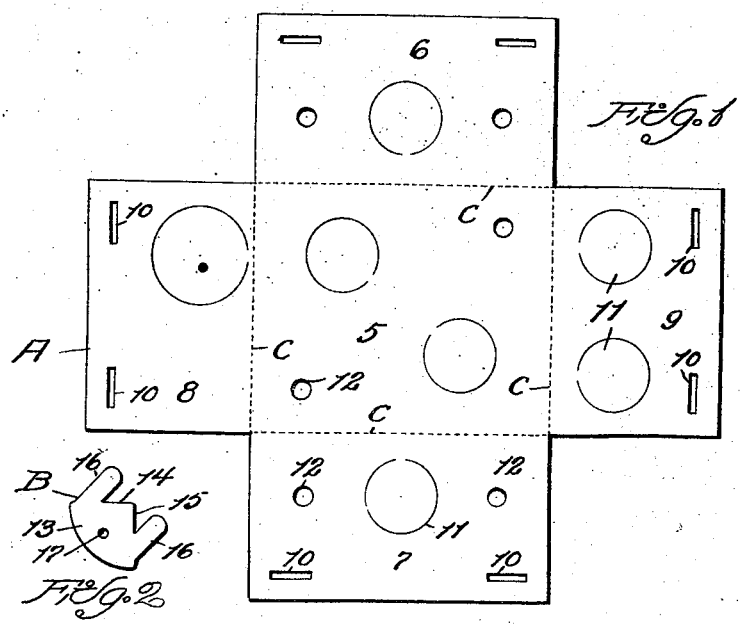
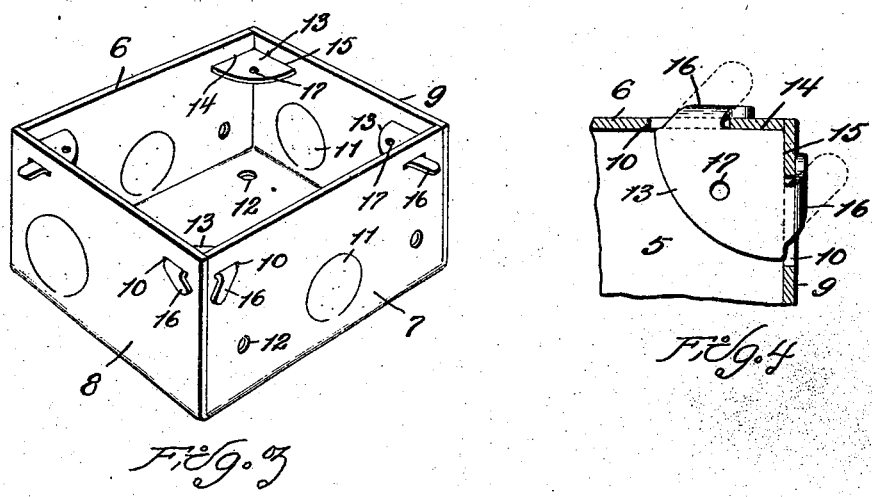
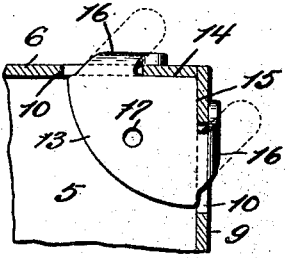
INVENTOR
HENRY M. STIEGLITZ,
by Eilers & Schaumberg, Attorneys.

Patented July 10, 1928.

1,676,298

UNITED STATES PATENT OFFICE.

HENRY M. STIEGLITZ, OF ST. LOUIS, MISSOURI, ASSIGNOR TO FRANK ADAM ELECTRIC CO., OF ST. LOUIS, MISSOURI, A CORPORATION.

OUTLET BOX.

Application filed March 21, 1925. Serial No. 17,317.

My invention relates to improvements in outlet boxes for installation in wall cavities or openings and more particularly to boxes adapted to receive electrical switches, sockets, receptacles and the like and arranged for the support of a cover or flush, wall or finish plate.

Ordinarily, such boxes are made of metal and provided with devices, not elemental to the box, for the sole purpose of the attachment of a cover plate.

My object is to provide a box which is especially designed for use in connection with a cover plate and which comprises walls or sides, having relatively angular disposition, and elements which serve the double purpose of relatively securing the walls and supporting the cover plate.

My improvements consist in the novel construction, arrangement and combination of parts as hereinafter fully, clearly and concisely described, definitely pointed out in my claims and illustrated by the accompanying drawing in which:—

Fig. 1 is a plan view of a blank from which the box of my invention may be formed; Fig. 2 is a plan view of a blank from which the cover-plate support of my invention may be formed; Fig. 3 is a perspective view of a complete box embodying my improvements; and Fig. 4 is a sectional plan showing a corner-fragment of a box and a cover-plate support.

Referring to the drawings, A designates the blank for the box and B the blank for the cover-plate support. As shown, the blank A is substantially of the contour of a Greek cross and comprises areas, as defined by dotted lines C, forming a bottom 5, and walls 6, 7, 8 and 9, all of which are of substantially rectangular shape.

In each wall, adjacent each of its corners farthest from the bottom 5, is an opening 10, preferably in the form of a slot, having a trend paralleling the outermost margin of the wall whereby the slots of the walls 6 and 7 are substantially at a right angle to the slots of the walls 8 and 9. By preference, a plurality of incomplete circular cuts 11, whereby selectively located holes, or openings for wiring may be formed, are provided, and by further preference, certain areas of the blank are provided with perforations 12 for the securing of the box in the wall cavity.

The cover-plate support, as shown by the blank B, in Fig. 2, comprises a body 13 having essentially the substantially right angled margins 14 and 15, and by preference formed of substantially triangular shape, and projecting from the margins 14 and 15 of which are the lugs 16 which are relatively parallel. To adapt the support for the attachment of a cover plate there is formed in the body 13 a perforation 17, which by preference is internally threaded.

In the forming of the box the walls 6, 7, 8 and 9 are turned, on the lines designated C to stand vertical to the bottom 5, as shown in Fig. 3, which brings all of the slots 10 to a plane common to all and which relates the slots in pairs, and by which the slots of each pair are disposed at a right angle to each other. As for example the slots of the walls 6 and 7 are paired with the slots of the walls 8 and 9.

After the walls are so formed a cover-plate support is placed with its lugs 16 inserted through each pair of the slots 10, as shown by dotted lines in Fig. 4, and by impact, or pressure, the lugs are then bent, turned or upset, along lines paralleling the margins 14 and 15 of the support-bodies 13 and the outer margins of the slots 10, to overlap the outer faces of the walls. Obviously, by reason of the bending or flexing lines of the lugs being disposed relatively at a right angle, the bodies of the lugs will be moved, in their bending, in directions toward each other and hence the single element, that is, the cover-plate support, and the single act of its attachment to the walls, serves to provide an attaching means for the cover plate and securing means for adjacent walls as well as a proper and true placement of the plate-support and a bringing together of the margins of adjacent walls to form true and uniform box corners.

I claim:

1. As a new article of manufacture, a box-wall securing device comprising a body having a pair of relatively angularly disposed margins and a lug extending from each of the said margins at an angle other than a right angle.

2. As a new article of manufacture, a box-wall securing device comprising a body having a pair of relatively angularly disposed margins, a lug formed as an integral projection from each of said margins, said lugs having trends at an angle to said margins and relatively parallel.

3. A box of the class described, comprising a bottom and side walls, constructed as a unit, there being openings in the side walls related in pair, securing devices comprising each, a corner support having a pair of flexible lugs for extension through said related pairs of openings and said lugs of each device being bent in directions toward each other.

4. A box-wall securing device comprising flexible lugs adapted to be bent against the walls of the box and a corner brace uniting said lugs and adapted to position said walls and form a support within the box for a box closure.

5. A box-wall securing device adapted to unite the walls of the box angularly to each other and comprising a substantially flat member adapted to fit within a corner of the box and act as a spacing means for determining the angle of said corner and forming a support for a box closure, and flexible lugs attached to said member and adapted to be bent against the walls of the box.

6. The combination of a box comprising a bottom and side walls constructed as a unit, the box having openings in the side walls related in pairs for the reception of securing devices, and a securing device comprising a seat adapted to support a box closure and integral flexible lugs adapted to extend through the openings in said side walls.

7. The combination of a box comprising a bottom and side walls constructed as a unit, the box having openings in the side walls related in pairs for the reception of securing devices and a sheet metal securing element comprising a web adapted to be positioned against adjacent side walls as a corner brace and form a support for a box closure and having integral flexible lugs adapted to be folded toward each other to rigidly hold said walls.

8. In an electric outlet box, formed of a single blank, an internal corner support having a flexible wall-gripping portion.

9. In an electric outlet box, an element forming a bottom and walls, and a wall positioning element adapted as a box-closure rest, securing means integral with one of the elements, the other element being adapted to receive the securing means.

10. In an electric outlet box, an element forming a bottom and walls, and an element adapted as a box-cover support; one of said elements being apertured and the other element having a flexible member adapted to coact with the apertured element to serve as a wall securing device.

HENRY M. STIEGLITZ